Feb. 8, 1966  E. L. LUNDE  3,233,283
METHOD FOR DIRECTING THE FALL OF STUNNED ANIMALS
Original Filed May 23, 1963  2 Sheets-Sheet 1
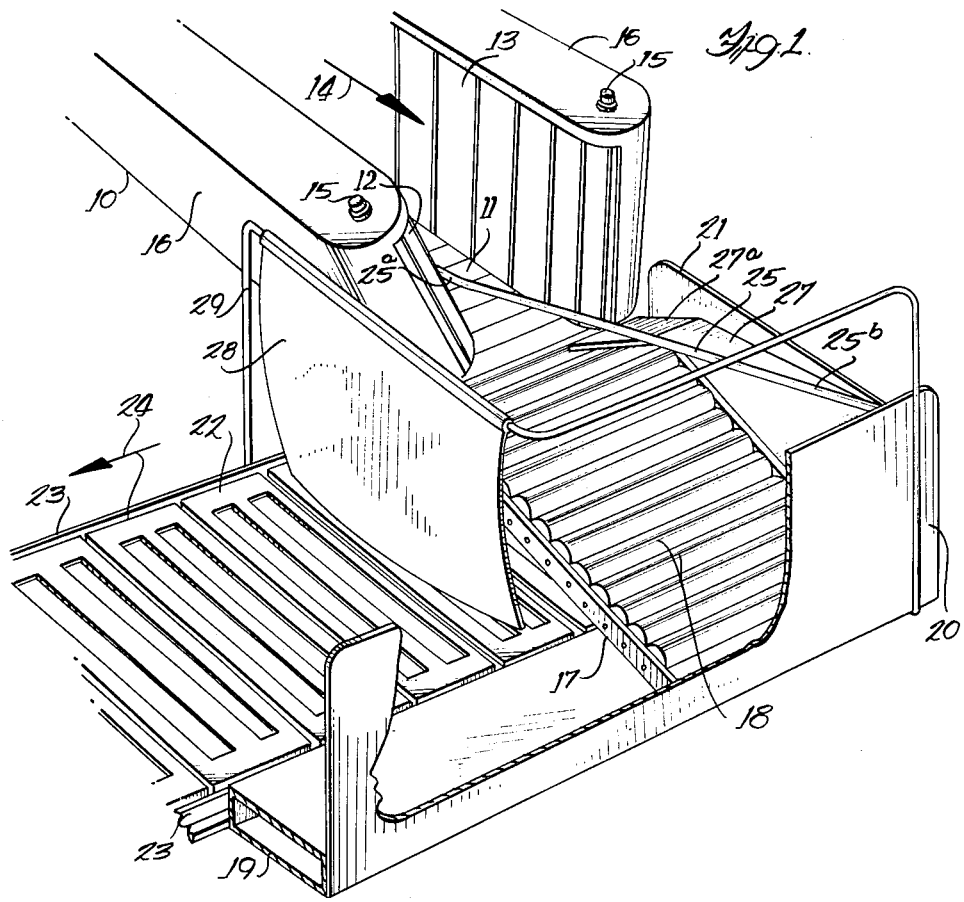
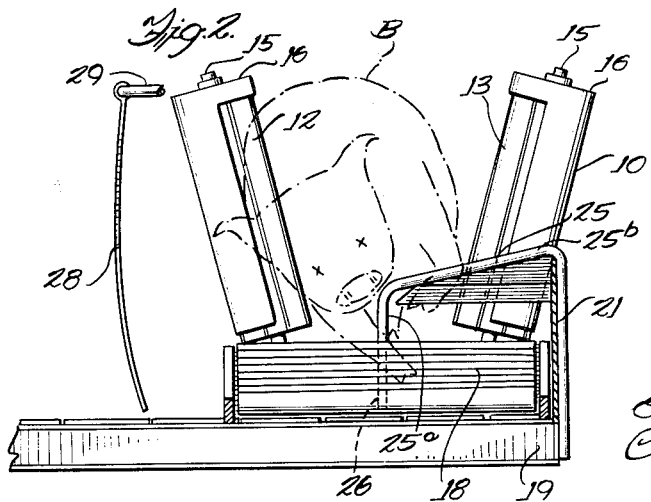
Inventor
Erwin L. Lunde
Carl C. Batz
Attorneys

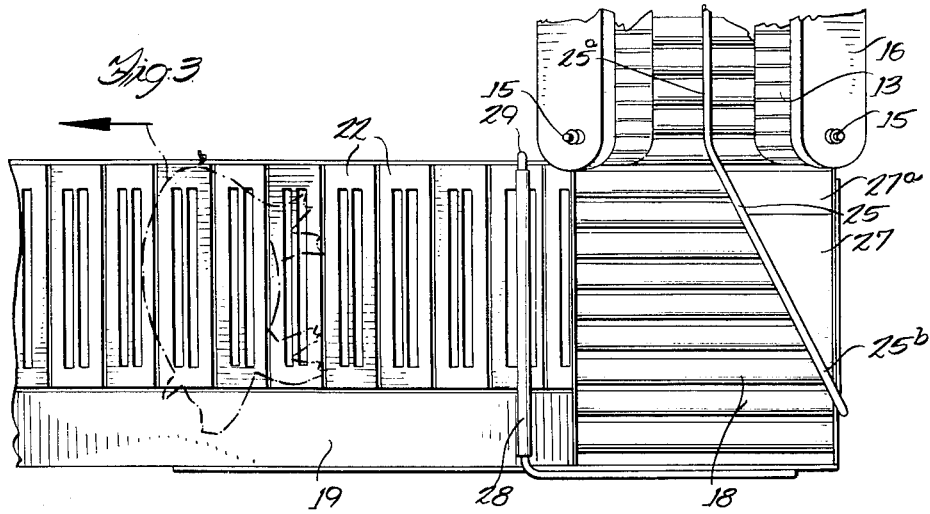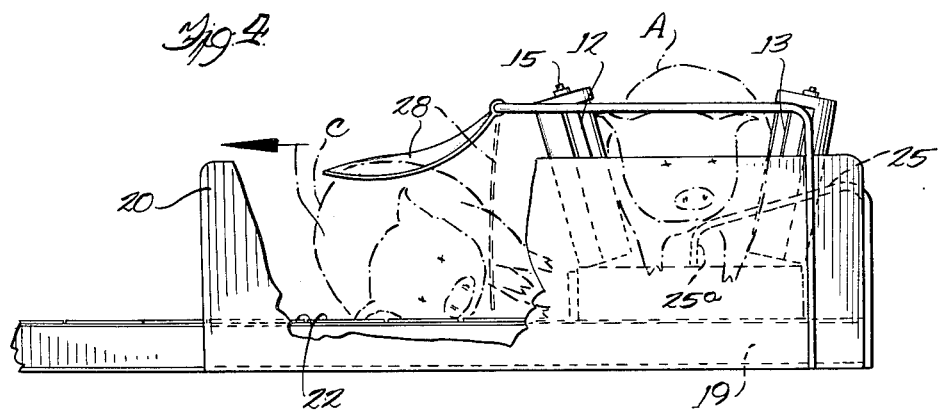

United States Patent Office 3,233,283
Patented Feb. 8, 1966

3,233,283
METHOD FOR DIRECTING THE FALL OF STUNNED ANIMALS
Ervin L. Lunde, Mason City, Iowa, assignor to Armour and Company, Chicago, Ill., a corporation of Delaware
Original application May 23, 1963, Ser. No. 282,680. Divided and this application Sept. 25, 1964, Ser. No. 405,326
6 Claims. (Cl. 17—45)

This is a division of application Serial No. 282,680, filed May 23, 1963.

This invention relates to a method for directing the fall of animals, such as hogs and other livestock, after they have been stunned as a preliminary step in slaughtering operations.

In conventional abattoir practice, animals to be slaughtered are driven in single file through a restrainer and then, while they are so immobilized, are electrically or mechanically stunned. After they have been conveyed to the end of the restrainer, the stunned animals, no longer being supported against lateral movement, fall one way or the other in an unpredictable manner, and are advanced to a station where they are "stuck" or bled.

One of the problems in achieving efficient processing of the animals lies in the difficulty of orienting the fallen animals so that they are in proper position for sticking. Repositioning of the stunned animals is generally difficult and is, in any case, time consuming, and bleeding of the animals in the various unpredictable positions they happen to fall impairs the efficiency of the sticking operation and complicates subsequent processing steps.

Accordingly, it is an object of the present invention to overcome the aforementioned problems in handling stunned animals and, more specifically, to provide a simple but highly effective method and apparatus for directing stunned animals so that they fall in a predetermined direction and, consequently, are all turned in the same direction for sticking. In this connection, it is a specific object to provide an apparatus and method for rotating a stunned animal as it is advanced axially, and for limiting the extent of rotation so that all of the animals will assume substantially the same position for sticking.

Other objects will appear from the specification and drawings in which:

FIGURE 1 is a broken perspective view, taken partly in section, illustrating an apparatus embodying the present invention;

FIGURE 2 is an end view of the apparatus, taken partly in section, illustrating a hog as its fall is being directed by the apparatus;

FIGURE 3 is a broken top plan view of the apparatus;

FIGURE 4 is an end view, taken partly in section, illustrating the apparatus with one hog in fallen position and another hog supported within the restrainer.

In the embodiment of the invention illustrated in the drawings, the numeral 10 generally designates a restrainer comprising an endless slat conveyor 11 forming a movable bottom or walk, and a pair of side conveyors 12 and 13. The side conveyors are disposed above the bottom conveyor 11 and are spaced apart to define a narrow chute through which hogs are driven in single file. Conveyors 12 and 13 thus form movable side walls which, like conveyor 11, rotate in the direction of arrow 14 to advance animals toward the discharge end of the restrainer. In the illustration given, side conveyors 12 and 13 are rotatably carried by shafts 15 journaled in the conveyor housings 16.

At the discharge end of the restrainer is a forwardly and downwardly inclined ramp 17 which, in the illustration given, comprises a bed of transversely extending rollers 18. At its rear end, the ramp or bed is substantially flush with the upper surface of conveyor 11 and therefore forms an inclined extension of the bottom conveyor beyond the limits of side conveyors 12 and 13.

Adjacent the lower end of the inclined roller bed 17, and mounted upon frame 19, is an upstanding stop plate or shield 20. A similarly upstanding side plate or shield 21 may be secured to one side of the roller bed, the two plates 20 and 21 serving to protect operators as animals are discharged from the restrainer onto the ramp.

Beneath the roller bed and extending outwardly from the open or unshielded side thereof is a sticking conveyor 22. Like conveyor 11, sticking conveyor 22 is an endless series of interconnected slats carried by supporting rails 23 and advanced by suitable driving means (not shown). As indicated by arrow 24, the sticking conveyor is operated to convey animals in a generally horizontal direction away from the unshielded side of roller bed 17.

Referring to FIGURES 1, 2 and 3, it will be observed that a guide member or bar 25 extends generally in a longitudinal direction over the bottom conveyor 11 of the restrainer and over the ramp extension 17 of that restrainer. Specifically, the rear portion 25a of the bar extends over the bottom conveyor 11 along the longitudinal midline thereof. The rear portion 25a slopes gradually upwardly and forwardly so that at the discharge end of the restrainer it is well above the knee height of the animals advanced along the restrainer.

At the front or discharge end of the restrainer, bar 25 departs from the longitudinal midline of that restrainer (or from a forward extension of that midline) to provide an upwardly and laterally sloping front portion 25b. Thus, the front portion 25b is spaced above the roller bed at an increasing distance which, at its maximum, substantially exceeds the ground clearance for the body of each animal in a normal standing position. Of particular importance is the fact that the front portion of the bar diverges from the longitudinal midline of conveyor 11 and ramp 17, and from the path of movement of animals advancing along and being discharged from the restrainer.

The stationary guide bar 25 is rigidly anchored in place by any suitable means. In the illustration given, the bar turns downwardly at its front end and is welded or otherwise rigidly secured to frame 19 and side plate 21. At its rear end, the bar may be similarly affixed to the frame adjacent the entrance of the restrainer, as indicated by numeral 26 in FIGURE 2.

As shown most clearly in FIGURES 3 and 1, a gusset-shaped guide plate 27 is secured to the front portion 25b of the bar and to the lateral shield 21. The rear end portion 27a of the guide plate slopes downwardly (at a sharper angle than the guide bar) towards the discharge end of horizontal conveyor 11.

A baffle 28, formed of heavy sheet rubber or other suitable flexible sheet material, is suspended above sticking conveyor 22 by support 29, the support consisting of a bar which extends across the sticking conveyor at a spaced distance from the unshielded side of ramp 17, and which has its opposite ends rigidly secured to frame 19. The height of the baffle and its supporting bar exceeds the cross sectional body dimensions of animals adapted to be carried on the sticking conveyor and, therefore, such animals may readily pass beneath the baffle-mounting bar, the baffle flexing outwardly to accommodate their passage.

In the operation of the apparatus, hogs or other livestock are advanced in single file along the restrainer towards the discharge end thereof. As they are carried forwardly upon the restrainer's bottom conveyor 11, an operator standing alongside the restrainer stuns the animals with a suitable electrical or mechanical device. Side conveyors 12 and 13 brace the stunned animals against lateral movement, and the rear portion 25a of the guide bar which is straddled by the animals limits their downward movement. Therefore, a hog A upon reaching the discharge end of the restrainer assumes the general position illustrated in FIGURE 4.

At the time of discharge from the restrainer, a substantial portion of the weight of each hog rests upon guide bar 25. The downward inclination of the ramp, and the termination of lateral support by side conveyors 12 and 13, causes the stunned hog to fall downwardly and forwardly, pivoting about its axis. Since the forward portion 25b of the guide bar angles laterally away from the direction of axial movement of the animal, one side of that animal (the animal's left side in the illustration given) is supported by the bar, causing the hog to fall downwardly and forwardly towards its unsupported side, as represented by B in FIGURE 2. Guide plate 27 with its downwardly sloping rear skirt portion 27a contributes in directing the fall of the animal by engaging and lifting one of its forelegs (FIGURE 2). Since the height of the guide bar's front portion 25b above ramp 17 exceeds the normal ground clearance of the animal's body, the opposite foreleg is ineffective in resisting the pivoting or turning movement and simply swings laterally beneath the bar in a counterclockwise direction as viewed in FIGURE 2.

The stunned animal, thrown off balance in a predetermined direction by the diverging guide bar 25, topples against baffle 28 and onto the sticking conveyor 22. The weighted baffle flexes outwardly to control the fall of the animal and, particularly, to limit its extent of rotation after landing upon the sticking conveyor, without preventing animal movement in the direction of advancement of that conveyor. The baffle thereby limits the extent of rolling action induced by the guide bar, with the result that hogs passing through the apparatus, regardless of variations in their size, weight and configuration, all assume the same position, as represented by C, upon the sticking conveyor.

While in the foregoing an embodiment of the present invention has been disclosed in considerable detail for purposes of illustration, it will be understood by those skilled in the art that many of these details may be varied without departing from the spirit and scope of the invention.

I claim:

1. In a method for directing the fall of stunned animals, the steps of advancing a stunned animal forwardly astride a guide member diverging in one direction laterally with respect to the path of movement of said animal, and continuing to advance said animal along said path of movement until at least the forelegs of the same have been urged laterally by said guide member to direct the fall of said animal in an opposite lateral direction.

2. In a method for directing the fall of stunned animals, the steps of advancing a stunned animal forwardly while the legs of the same are astride a guide member diverging in one direction laterally with respect to the path of movement of said animal while at the same time supporting the body of said animal against lateral movement, continuing to advance said animal along said path until at least the forelegs of the same have been urged laterally to rotate the body of the animal about its axis, and simultaneously discontinuing the lateral support for said body so that said animal falls with its legs facing laterally in the direction of divergence of said guide member.

3. In a method for directing the fall of stunned animals, the steps of supporting a stunned animal upon a guide member extending longitudinally between the legs thereof, and advancing said animal along a path divergent with respect to the direction of said member to urge the legs laterally in one direction from beneath said animal and cause it to fall in an opposite lateral direction.

4. In a method for directing the fall of stunned animals, the steps of advancing a stunned animal along a guide member extending longitudinally between the legs thereof, supporting a substantial portion of the weight of said animal upon said guide member, and thereafter advancing said animal along a path laterally divergent with respect to the direction of said member to urge the animal's legs laterally in one direction and cause the stunned animal to fall in the opposite lateral direction.

5. In a method for directing the fall of stunned animals, the steps of advancing a stunned animal forwardly while the legs of the same are astride a guide member diverging in one direction laterally with respect to the path of movement of said animal while at the same time supporting the body of said animal against lateral movement, continuing to advance said animal along said path until at least the forelegs of the same have been urged laterally to rotate the body of the animal about its axis, simultaneously discontinuing the lateral support for said body so that said animal falls with its legs facing laterally in the direction of the divergence of said guide member, and restraining the extent of rotation of said animal after the same has fallen.

6. In a method for directing the fall of stunned animals, the step of supporting a stunned animal upon a guide member extending longitudinally between the legs thereof, advancing said animal along a path divergent with respect to the direction of said member to urge the legs laterally in one direction from beneath said animal and cause it to fall in an opposite lateral direction, and limiting the extent of rotation of the falling animal.

References Cited by the Examiner
UNITED STATES PATENTS

| | | | |
|---|---|---|---|
| 712,579 | 11/1902 | Nicholson et al. | 17—1 |
| 3,143,762 | 8/1964 | Murphy | 17—45 |

SAMUEL KOREN, *Primary Examiner.*

LUCIE H. LAUDENSLAGER, *Examiner.*